United States Patent [19]

Kobayashi et al.

[11] Patent Number: 4,639,797
[45] Date of Patent: Jan. 27, 1987

[54] RECORDING OR REPRODUCING APPARATUS

[75] Inventors: Junji Kobayashi, Tokyo; Takashi Kimura, Kanagawa, both of Japan

[73] Assignee: Canon Kabushiki Kaisha, Tokyo, Japan

[21] Appl. No.: 814,623

[22] Filed: Dec. 30, 1985

[30] Foreign Application Priority Data

Dec. 28, 1984 [JP] Japan ................... 59-279327

[51] Int. Cl.$^4$ ............................................. G11B 15/66
[52] U.S. Cl. .................................................... 360/71
[58] Field of Search ...................................... 360/71, 85

[56] References Cited

U.S. PATENT DOCUMENTS 4,425,590  1/1984  Johnstone et al. ................... 360/71

Primary Examiner—George G. Stellar
Attorney, Agent, or Firm—Toren, McGeady and Goldberg

[57] ABSTRACT

A recording or reproducing apparatus comprising first means for moving a cassette or a rotary head drum between a position where the cassette and the drum relatively go away from each other and a position where the cassette and the drum relatively come near to each other, detection means for detecting whether or not the cassette is loaded, pulling-out means for pulling out a record bearing medium from the cassette, the pulling-out means being movable between a first position where the pulling-out means is positioned in the cassette and a second position where the pulling-out means has wound the pulled out medium about the rotary head drum by a predetermined angle, and second means responsive to the detection means for moving the pulling-out means from the first position to the second position when the cassette is loaded and for moving the pulling-out means from the first position to a third position which is a middle position between the first position and the second position when the cassette is not loaded.

7 Claims, 14 Drawing Figures

RECORDING OR REPRODUCING APPARATUS

BACKGROUND OF THE INVENTION

1. Field of the Invention:

The present invention relates to a recording or reproducing apparatus such as a video tape recorder or the like using a tape-shaped record bearing medium, and, more particularly to a recording or reproducing apparatus arranged to move a cassette housing therein the tapeshaped record bearing medium or a rotary head drum between a position where the cassette and the drum relatively go away from each other and a position where the cassette and the drum relatively come near to each other.

2. Description of the Prior Art:

In a video tape recorder using a rotary head drum (hereinafter simply referred to as a drum), a recording or reproduction in the state where part of the drum is positioned in an opening of a cassette is considered to be one means for minimizing the apparatus (see, for example, Japanese Laid-open Patent Application No. Sho 59-171070). Therefore, it is necessary to move a cassette loading stand or the drum to a position where the cassette loading stand and the drum relatively come near to each other at least at the time of recording or reproduction. Furthermore, in order to rid a projection in the appearance of the apparatus at the time of non-use, it is desired to relatively move the cassette loading stand or the drum to the same position as that at the time of recording or reproduction, even when a cassette is not loaded in the cassette loading stand. On the other hand, when the cassette loading stand or the drum is moved, guide members for pulling out a tape from the cassette are also moved. If the guide members are moved to a final position adapted for recording or reproduction when the cassette is not loaded, it is apparently wasteful. This also causes the inconvenience that an unnecassary time is uselessly spent at the time of a change-over between the recording or reproducing state and the non-use state.

SUMMARY OF THE INVENTION

The present invention has been made in view of the above circumstances. Accordingly, it is a main object of the present invention to provide a novel recording or reproducing apparatus capable of eliminating all of the above inconveniences in the prior art.

Another object of the present invention is to provide a recording or reproducing apparatus arranged to move a cassette or a rotary head drum between a position where the cassette and the drum relatively go away from each other and a position where the cassette and the drum relatively come near to each other, comprising means for shortening the moving time of means for pulling out a record bearing medium from the cassette when the cassette is not loaded, and for shortening the time required for changing the apparatus from the recording or reproducing state to the non-use state and vice versa, including the time required for the above relative movement.

A further object of the present invention is to provide a recording or reproducing apparatus of the above kind comprising means for reducing the number of catchings effected by the means for pulling out a record bearing medium up to the final catching, to improve the mechanical durability of the apparatus.

To attain these objects, according to an aspect of the present invention, a recording or reproducing apparatus comprises first means for moving a cassette or a rotary head drum between a position where the cassette and the drum relatively go away from each other and a position where the cassette and the drum relatively come near to each other, detection means for detecting whether or not the cassette is loaded, pulling-out means for pulling out a record bearing medium from the cassette, the pulling-out means being movable between a first position where the pulling-out means is positioned in the cassette and a second position where the pulling-out means has wound the pulled out medium about the rotary head drum by a predetermined angle, and second means responsive to the detection means for moving the pulling-out means from the first position to the second position when the cassette is loaded and for moving the pulling-out means from the first position to a third position which is a middle position between the first position and the second position when the cassette is not loaded.

Therefore, according to the aspect of the present invention, it is possible to shorten the time required for moving the pulling-out means when the cassette is not loaded and to shorten the time required for changing the apparatus from the recording or reproducing state to the non-use state and vice versa, including the time required for the relative movement of the cassette and the rotary head drum, so that an operability in the recording or reproducing apparatus can be improved.

Furthermore, since the pulling-out means does not move to the final position thereof when the cassette is not loaded, the number of the so-called catchings can be decreased to reduce the opportunity of abrasion caused by the catchings, so that the mechanical durability in the apparatus can be improved.

Still further objects, aspects and features of the present invention will become apparent from the following detailed description of the preferred embodiments thereof with reference to the accompanying drawings.

DETAILED DESCRIPTION OF THE PREFERRED EMBODIMENTS

Hereinafter, preferred embodiments of the present invention will be described with reference to the drawings. In the following, a lifting and lowering mechanism for a cassette holder in an embodiment of a recording or reproducing apparatus of the present invention, a construction of the embodiment of the recording or reproducing apparatus of the present invention, an operation of the same, another embodiment of a recording or reproducing apparatus of the present invention are described in that order, about an example in which the relative movement of a cassette to a drum is effected by the movement of a cassette loading stand. It should be noted that the present invention can be applied to a case in which the relative movement between the cassette and the drum is effected by the movement of the drum.

Figure 9A:
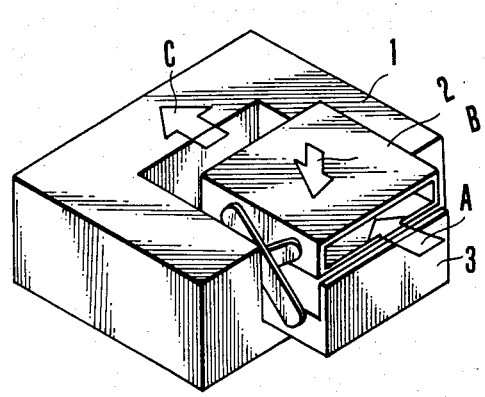
FIGS. 9A and 9B show the appearance of an embodiment of a recording or reproducing apparatus of the present invention, FIG. 9A being a perspective view showing the state in which a cassette holder has been lifted and a cassette loading stand has been projected, and FIG. 9B being a perspective view showing the state in which the cassette holder and the cassette loading stand are taken into a main body of the apparatus.
Figure 9B:
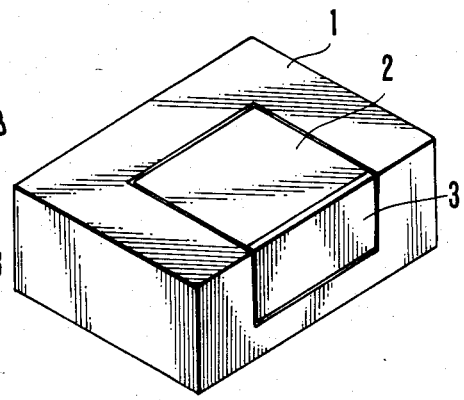

A lifting and lowering mechanism for a cassette holder in an embodiment of a recording or reproducing apparatus of the present invention (FIGS. 9A, 9B, 10A and 10B):

FIGS. 9A and 9B show the appearance of an embodiment of a recording or reproducing apparatus of the present invention. In FIG. 9A, the reference numeral 1 denotes a main body of the recording or reproducing apparatus, 2 denotes a cassette holder, and 3 denotes a cassette loading stand on which the cassette holder 2 is mounted. After a cassette 5 (FIG. 10A) housing a magnetic tape as an example of a record bearing medium is inserted into the cassette holder 2 in the direction of arrow A, the cassette loading stand 3 is pushed to be lowered in the direction of arrow B. The cassette loading stand 3 is provided with a lid opening mechanism for the cassette 5 and reel tables. After the cassette holder 2 has been lowered, it is moved in the direction of arrow C, so that the apparatus comes into the state shown in FIG. 9B. The recording or reproducing apparatus appears as shown in FIG. 9B at the time of the recording or reproducing state and the non-use state of the apparatus, while it appears as shown in FIG. 9A at the time of an intermediate operation such as an insertion or ejection of the cassette 5.

Figure 10A:
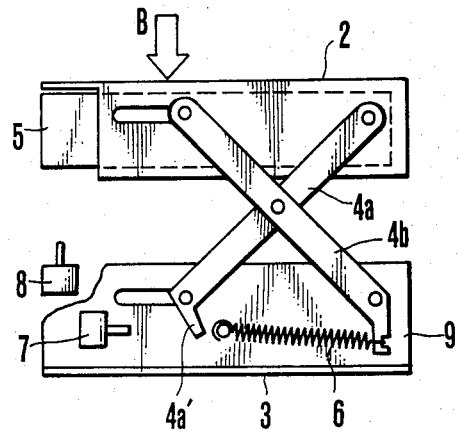
FIGS. 10A and 10B show a lifting and lowering mechanism for the cassette holder in the embodiment of the recording or reproducing apparatus of the present invention, FIG. 10A being a side view showing the state in which the cassette holder has been lifted, and FIG. 10B being a side view showing the state in which the cassette holder has been lowered.
Figure 10B:
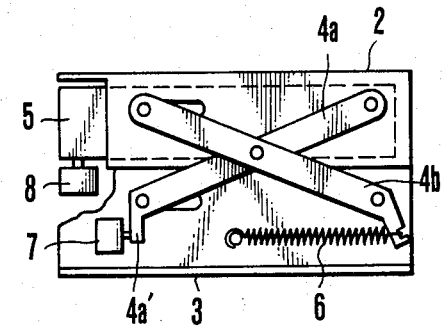

FIGS. 10A and 10B show a lifting and lowering mechanism for the cassette holder 2 and a detecting device for detecting whether the cassette 5 is loaded or not. FIG. 10A corresponds to the state shown in FIG. 9A. The cassette holder 2 is urged upward by a prior-known mechanism including levers 4a and 4b which are crossed in the X-shaped manner and a spring 6. The cassette holder 2 is pushed to be lowered by prior-known means, and, then, is held by a prior-known holding mechanism in the state shown in FIG. 10B. At this time, an end portion 4a' of the lever 4b comes into contact with a switch 7, so that the switch 7 detects that the cassette holder 2 has been lowered. Furthermore, when the cassette 5 is loaded (for example, when the cassette 5 is held in the cassette holder 2 which has been lowered), the cassette 5 comes into contact with a switch 8, so that the switch 8 detects that the cassette 5 is loaded. The above mechanisms are mounted on the cassette loading stand 3 through a base 9. It should be noted that the detection of the cassette 5 being loaded or not may be performed by detecting whether or not a transmitted light type tape end detecting mechanism is operating at both ends.

Figure 1A:
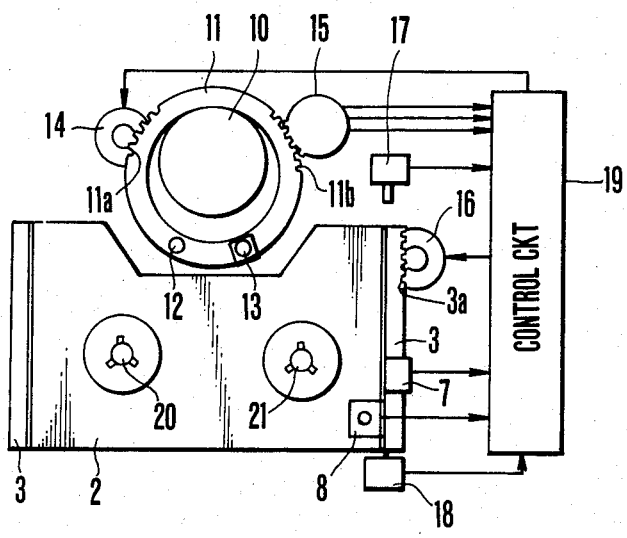
FIG. 1A is a view showing the construction of essential parts and a control circuit of a recording or reproducing apparatus as an embodiment of the present invention.

A construction of the embodiment of the recording or reproducing apparatus of the present invention (FIGS. 1A and 1B):

FIG. 1A shows a moving mechanism for a cassette loading stand as an example of the above first means, and a moving mechanism for guide members for pulling out a tape from a cassette (so-called loading mechanism) as an example of the above second means. In this example, the movement of the guide members to the above third position is effected by utilizing the loading mechanism.

The state shown in FIG. 1A is that before a cassette is loaded. In FIG. 1A, the reference numeral 10 denotes a drum, and 11 denotes a prior-known upper loading ring. A guide 12 mounted on the upper loading ring 11 pulls out a tape from that cassette 5 and winds the tape about the drum 10. A gear 11a of the loading ring 11 engages with a loading motor 14, so that the loading ring 11 is rotatable. A gear 11b of the loading ring 11 engages with a rotating position detector 15. The rotating position detector 15 detects, as described later in FIG. 1B, rotating positions of the upper loading ring 11 and a lower loading ring (not shown) and moving positions of the guide members associated with the rotating positions, to supply a signal to a control circuit 19. A second guide 13 for pulling out a tape is arranged at the back side of the upper loading ring 11 and is mounted on the lower loading ring which rotates in the reverse direction to that of the upper loading ring 11 by prior-known means. When the tape is pulled out, the guides 12 and 13 move symmetrically in right and left. As is known, pinch rollers, tension pins and other guide members (not shown) move to the respective predetermined positions as the guides 12 and 13 move.

A cassette motor 16 engages with a gear portion of the cassette loading stand 3, so that the cassette loading stand 3 can move toward the drum 10 and return back therefrom. Switches 17 and 18 detect the state in which the cassette loading stand 3 comes near to the drum 10 and the state in which the cassette loading stand 3 goes away from the drum 10, respectively, to supply signals to the control circuit 19. The control circuit 19 is arranged to include a micro-computer, and receives signals supplied by the switches 7, 8, 17 and 18 and the rotating position detector 15 to control the motors 14 and 16, etc. A feeding reel table 20 and take-up reel table 21 are mounted on the cassette loading stand 3, and are connected to a reel motor (not shown).

Figure 1B:
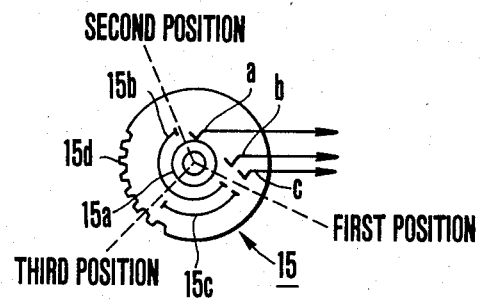
FIG. 1B is a plan view showing the details of a rotating position detector shown in FIG. 1A.

The rotating position detector 15 is provided with three contact pieces 15a to 15c along the circumference thereof, as shown in FIG. 1B. The contact piece 15a is arranged to extend by 360°. The contact piece 15b is arranged to extend by an angle less than 360°. The contact piece 15c is arranged to extend by an angle less than that of the contact piece 15b. Contact points "a" to "c" are arranged to come into contact with the contact pieces 15a to 15c, respectively, and are connected to the control circuit 19. A gear 15d engages with the gear 11b.

The respective contact relationships between the contact pieces 15a to 15c and the contact points "a" to "c" are further described. The contact piece 15a is kept in contact with the contact points "a" over the entire rotating angle at all times. The contact piece 15b and the contact point "b" separate when guide members (the guides 12 and 13, etc.) are situated at the above first position, in other words, when unloading has been completed. Immediately after a loading operation starts, the contact piece 15b comes into contact with the contact point "b". Furthermore, when the guide members have reached the above second position by the rotation of the upper and lower loading rings, in other words, when the loading operation has been completed, the contact piece 15b and the contact point "b" separate. The contact piece 15c and the contact point "c" separate when the guide members (the guides 12 and 13, etc.) have returned to the first position. Immediately after an operation to pull out the guide members starts, the contact piece 15c comes into contact with the contact point "c". Furthermore, when the guide members have reached the above third position by the rotation of the upper and lower loading rings, the contact piece 15c and the contact point "c" separate.

In the construction shown in FIG. 1B, when the upper and lower loading rings rotate, the rotating position detector 15 which engages with the upper loading ring 11 by the gears 11b and 15d rotates. The lengths of the contact pieces 15b and 15c, in other words, the angles at which they extend relative to the center of the rotating position detector 15, are set to correspond to the moving distance from the first position to the second position and the moving distance from the first position to the third position, respectively. Accordingly, the time when the contact between the contact piece 15b and the contact point "b" is severed by the rotation of the rotating position detector 15 corresponds to the time when the guide members (the guides 12 and 13, etc.) reach the second position. Similarly, the time when the contact between the contact piece 15c and the contact point "c" is severed corresponds to the time when the guide members reach the third position. Therefore, the moving position of the guide members (the guides 12 and 13, etc.) is detected by sensing the on-and-off state of signals produced between the contact points "a" and "b" and between the contact points "a" and "c". These signals are supplied to the control circuit 19. It should be noted that the contact-and-separation relationship between the contact piece 15b or 15c arranged in the reverse phase to that of FIG. 1B and the contact point "b" or "c" may be arranged in the reverse way to the above, so that the moving position of the guide members can be detected.

Figure 2:
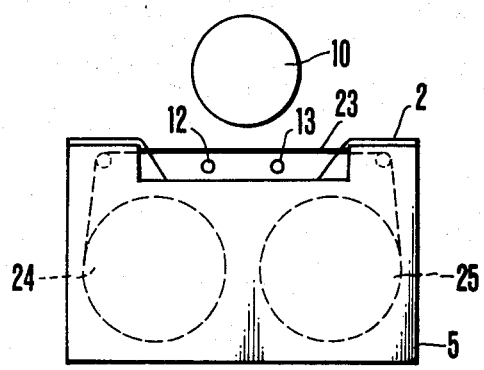
FIGS. 2 to 4 are views explaining various operations of the apparatus shown in FIG. 1A.
Figure 3:
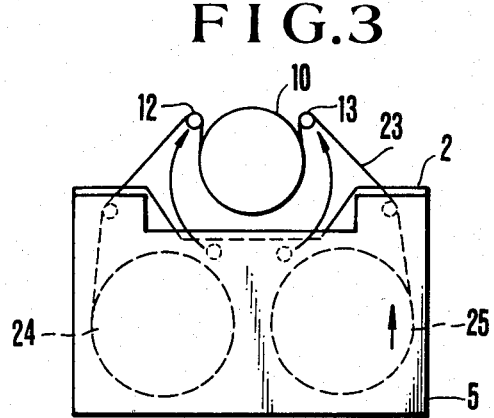
Figure 4:
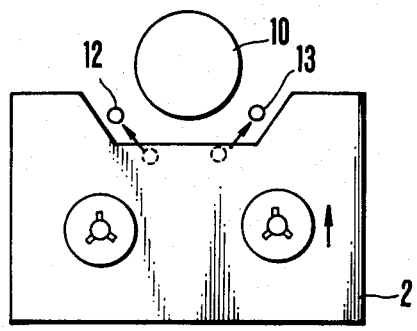
Figure 5A:
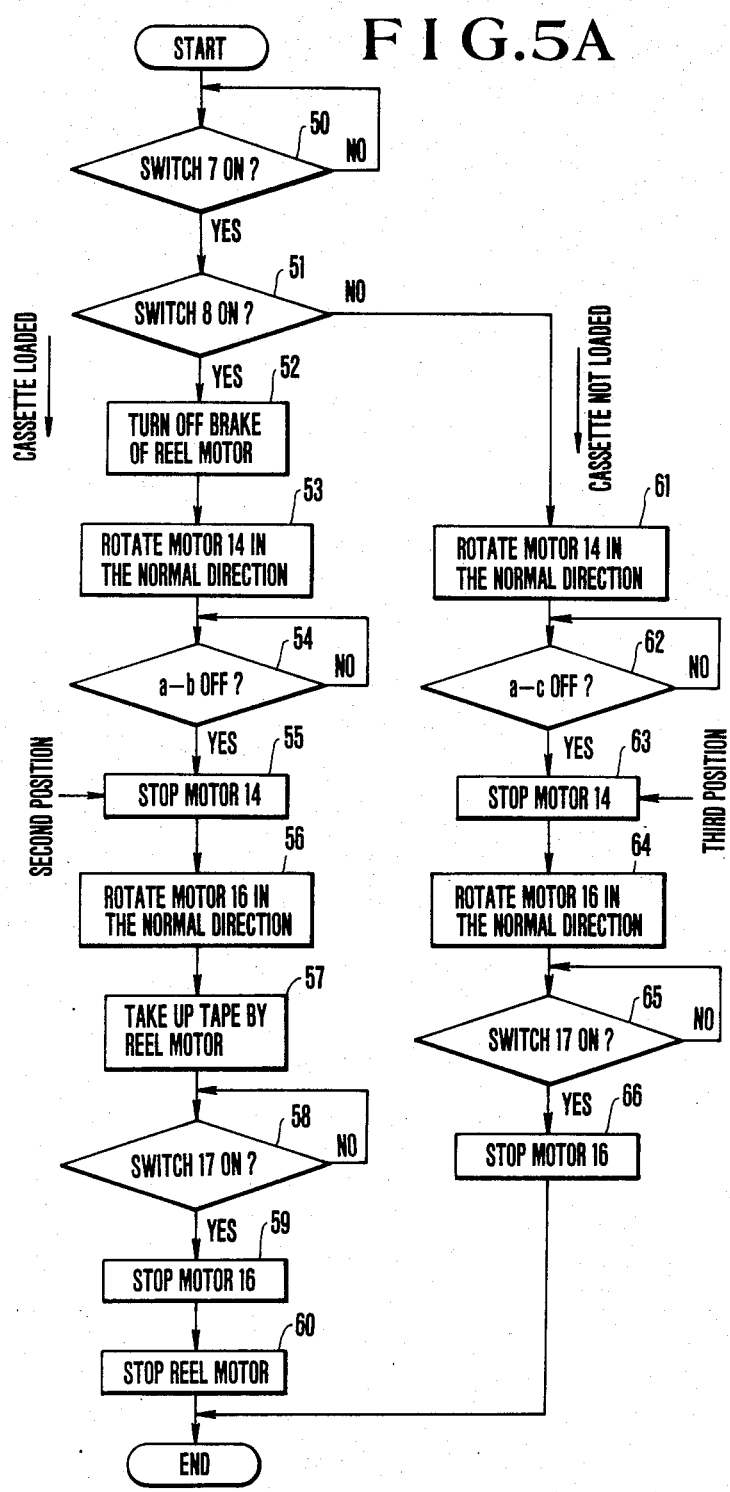
FIG. 5A is a flow chart explaining a loading operation in the apparatus shown in FIG. 1A.
Figure 5B:
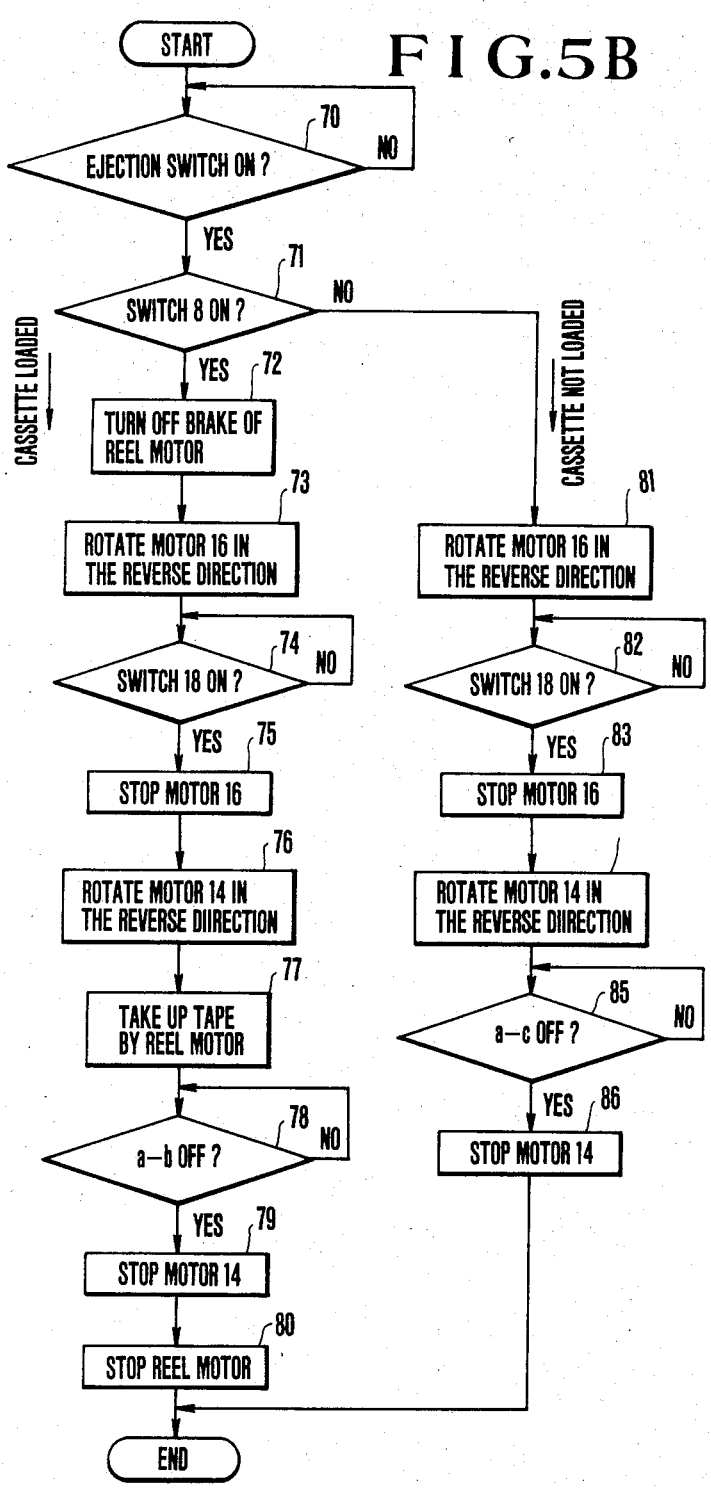
FIG. 5B is a flow chart explaining an ejecting operation in the above apparatus.

An operation of the embodiment of the recording or reproducing apparatus of the present invention (FIGS. 1A, 1B, 2-4, 5A and 5B):

Next, an operation of the apparatus shown in FIG. 1A will be described with reference to FIGS. 2-4, 5A and 5B. FIG. 2 shows the state that the cassette holder 2 into which the cassette 5 is inserted has been lowered downward in FIG. 9A, and the guide members (the guides 12 and 13, etc.) are situated at the above first position. The guides 12 and 13 enter inside of a tape loop of the opening of the cassette 5. Reels 24 and 25 about which a tape 23 is wound engage with the reel tables 20 and 21, respectively. FIG. 3 shows the state that the tape 23 has been pulled out from the cassette 5 and has been wound about the drum 10 over a predetermined angle. In this state, the guide members are situated at the above second position. The cassette loading stand 3 moves toward the drum 10. The apearance of the apparatus becomes shown in FIG. 9B. FIG. 4 shows the state that the cassette loading stand 3 moves toward the drum 10 in a case where the cassette 5 is not loaded. In this case, the guide members are situated at the above third position. The appearance of the apparatus becomes shown in FIG. 9B, too. FIG. 5A is a flow chart showing a control operation (loading operation) of the control circuit 19, regarding the loading at the time of the cassette 5 being loaded and the movement of the guide members to the third position at the time of the cassette 5 being not loaded. FIG. 5B is a flow chart showing a control operation (ejecting operation) of the control circuit 19 in cases where the cassette 5 loaded in the apparatus is ejected after the completion of recording or reproduction, and where the cassette holder 2 moves to newly insert the cassette 5 at the time of the non-use state of the apparatus.

In the apparatus shown in FIG. 1A, when the cassette holder 2 into which the cassette 5 is inserted has been lowered in the direction of arrow B shown in FIGS. 9A and 10A (FIG. 2), the switches 7 and 8 detect that the cassette holder 2 has been lowered and that the cassette 5 is loaded, respectively (steps 50 and 51 in FIG. 5A). In response to this detection, the control circuit 19 turns off the brake of the reel motor and starts the loading motor 14 rotating in the normal direction (steps 52 and 53). The upper and lower loading rings rotate in the respective normal directions. The guide members (the guides 12 and 13, etc.) move from the above first position to the above second position to wind the tape 23 about the drum 10 over the predetermined angle. When the contact between the contact piece 15b and the contact point "c" is severed by the rotation of the rotating position detector 15, the connection between the contact points "a" and "b" is cut off, so that the control circuit 19 detects the movement of the guide members to the second position (step 54). At this time, the control circuit 19 stops the loading motor 14 (step 55), and, then, starts the cassette motor 16 rotating in the normal direction to move the cassette loading stand 3 toward the drum 10 (step 56). During this time, the control circuit 19 operates the reel motor to rotate at least one of the reels 24 and 25 in the direction taking up the tape 23, so that the tape 23 does not slacken (step 57). When the cassette loading stand 3 moves to come into contact with the switch 17, the switch 17 is turned on, so that the control circuit 19 stops the cassette motor 16 and the reel motor (steps 58 to 60). Accordingly, the apparatus comes into the state capable of recording or reproduction (FIG. 3).

On the other hand, when the cassette holder 2 into which the cassette 5 is not inserted has been lowered, the switch 7 is turned on by detecting a descent of the cassette holder 2 (step 50). However, the switch 8 is kept off (step 51). In this case also, the control circuit 19 rotates the loading motor 14 in the normal direction and moves the guide members by the rotation of the upper and lower loading rings (step 61). However, in this case, since the switch 8 is kept off, the control circuit 19 detects the movement of the guide members to the third position when the contact between the contact piece 15c and the contact point "c" is severed by the rotation of the rotating position detector 15 and the connection between the contact points "a" and "c" is cut off (step 62). At this time, the control circuit 19 stops the loading motor 14, and, then, rotates the cassette motor 16 in the normal direction, so that the cassette loading stand 3 moves toward the drum 10 (steps 63 and 64). After this, similar to the above, when the switch 17 is turned on, the control circuit 19 stops the cassette motor 16, so that the apparatus entirely stops (steps 65 and 66) (FIG. 4). The control circuit 19 controls all the above operations, as described above.

Here, compare a case where the cassette 5 is loaded with a case where the cassette 5 is not loaded. As the rotating angles of the upper and lower loading rings in the letter case are less than those in the former case, a time required for the movement of the guide members (the guides 12 and 13, etc.) is shortened. Furthermore, even when the cassette 5 is not loaded, the cassette loading stand 3 moves to a position adapted for recording or reproduction, so that the appearance of the apparatus becomes shown in FIG. 9B.

Next, the ejecting operation will be described. First, an ejection switch (not shown) is closed (step 70 in FIG. 5B). When the switch 8 is turned on (step 71), that is, when the cassette 5 is inserted into the cassette holder 2, the guide members (the guides 12 and 13, etc.) are situated at the above second position. In response to the ejection switch being closed, the control ciruit 19 turns off the brake of the reel motor and rotates the cassette motor 16 in the reverse direction to that of the loading operation, so that the cassette loading stand 3 moves away from the drum 10 (steps 72 and 73). When the cassette loading stand 3 comes into contact with the switch 18 to turn on the switch 18, the control circuit 19 stops the cassette motor 16 and rotates the loading motor 14 in the reverse direction to that of the loading operation, so that the upper and lower loading rings rotate in the respective reverse directions to those of the loading operation to move the guide members toward the first position (steps 74, 75 and 76). During this time, the control circuit 19 operates the reel motor to rotate at least one of the reels 24 and 25 in the direction taking up the tape 23, so that the tape 23 does not slacken (step 77). When the rotating position detector 15 rotates according to the rotation of the upper loading ring 11 and the contact between the contact piece 15b and the contact point "b" is severed to cut off the connection between the contact points "a" and "b", the control circuit 19 stops the loading motor 14 and the reel motor (steps 78, 79 and 80). In this state, the guide members have returned to the first position, where the tape 23 enters inside of the cassette 5. After this, the cassette holder 2 is lifted by known means to a position adapted for inserting or taking out the cassette 5.

On the other hand, when the ejection switch is closed (step 70) and the switch 8 is kept off (step 71), the cassette 5 is not loaded in the cassette holder 2 and the guide members (the guides 12 and 13, etc.) are situated at the third position. In response to the ejection switch being closed, the control circuit 19 rotates the cassette moror 16 in the reverse direction to move the cassette loading stand 3 away from the drum 10 (step 81). When the switch 18 is turned on by the cassette loading stand 3, the control circuit 19 stops the cassette motor 16 and rotates the loading motor 14 in the reverse direction to move the guide members to the first position, similar to the above (steps 82, 83 and 84). When the contact between the contact piece 15c and the contact point "c" is severed by the rotation of the rotating position detector 15 to cut off the connection between the contact points "a" and "c", the control circuit 19 stops the loading motor 14 (steps 85 and 86). In this state, the guide members have returned to the first position. After this, the cassette holder 2 is lifted to the position adapted for inserting or taking out the cassette 5.

In the ejecting operation also, compare a case where the cassette 5 is loaded with a case where the cassette 5 is not loaded. A time required for moving the guide members (the guides 12 and 13, etc.) in the latter case is shorter than that in the former case. Therefore, in the apparatus shown in FIG. 1A, a time required for a change-over between the recording or reproducing state and the non-use state of the apparatus is shortened as compared with the conventional apparatus in which the guide members move to the loading position whether the cassette 5 is loaded or not. Furthermore, when the cassette 5 is not loaded, the guide members do not move to the final position, so that the number of catchings can be decreased to improve a mechanical durability.

Figure 6:
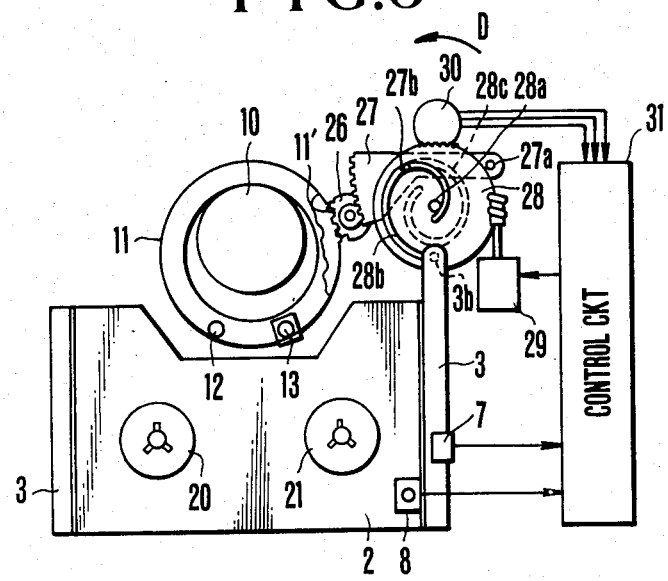
FIG. 6 is a view showing the construction of essential parts and a control circuit of a recording or reproducing apparatus as another embodiment of the present invention.
Figure 7:
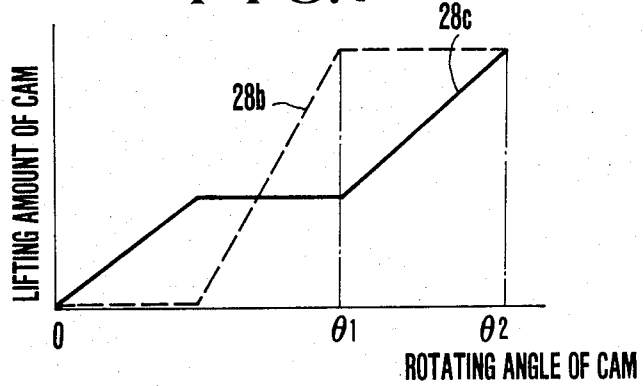
FIG. 7 is a view explaining the relation between the lifting amount and the rotating angle of a cam shown in FIG. 6.

Another embodiment of a recording or reproducing apparatus of the present invention (FIGS. 6 to 8):

FIGS. 6 and 7 show a guide members moving mechanism improved such that the movement of the guide members and the movement of the cassette loading stand 3 can easily be effected by the same drive source. In FIG. 6, members having the substantially same construction and function as those in the apparatus of FIG. 1A are denoted by the same reference numerals, and their explanations are omitted here. Reference numeral 28 denotes a cam, and 29 denotes a cam motor. The motor 29 rotates the cam 28 around a shaft 28a. Upper and lower surfaces of the cam 28 are provided with cam grooves 28b and 28c, respectively. The cam groove 28b engages with a pin 3b mounted on the cassette loading stand 3, so that the cassette loading stand 3 moves toward the drum 10 as the motor 29 rotates. The cam groove 28c engages with a pin 27b mounted on a cam lever 27 which is rotatable around a shaft 27a, so that the cam lever 27 rotates a lower loading ring 11' through an intermediate gear 26 as the motor 29 rotates. The upper and lower loading rings 11 and 11' are arranged in the substantially same way as those of the apparatus shown in FIG. 1A. The guide 13 is mounted on the lower loading ring 11', and the guide 12 is mounted on the upper loading ring 11. The upper and lower loading rings 11 and 11' rotate in opposite directions by known means. A rotating position detector 30 having the same construction as the rotating position detector 15 engages with a gear of the cam 28 to detect the rotating position of the cam 28. A control circuit 31 has the same construction and function as the control circuit 19 shown in FIG. 1A.

FIG. 7 shows the relationship between the rotating angles and the lifting amounts of the cam grooves 28b and 28c. In FIG. 7, the rotating angle is assumed to be "0" when the cam grooves 28b and 28c are situated at the position shown in FIG. 6. As the cam 28 rotates in the direction of arrow D shown in FIG. 6, first, the lifting amount of the cam groove 28c increases, so that the guide members (the guides 12 and 13, etc.) reach the position shown in FIG. 4. After that, the lifting amount of the cam groove 28b increases, so that the cassette loading stand 3 moves toward the drum 10. When the rotating angle of the cam groove 28b becomes $\theta 1$, the cassette loading stand 3 also comes into the state shown in FIG. 4. Next, the lifting amount of the cam groove 28c increases again, so that the guide members (the guides 12 and 13, etc.) reach the position shown in FIG.

3 when the rotating angle of the cam groove 28c becomes θ2. The rotating position detector 30 detects the above rotating positions of the cam 28, that is, the rotating angles 0, θ1, θ2, to supply a signal to the control circuit 31. In response to the signal, the control circuit 31 controls operations of the cam motor 29, etc.

In the apparatus of FIG. 6, when the cassette holder 2 is lowered in the direction of arrow B shown in FIG. 9A and the switch 7 is closed, if the switch 8 detects that the cassette is loaded, the control circuit 31 supplies a signal to the cam motor 29 to rotate the cam 28 by the rotating angle θ2, so that the guide members move to the second position adapted for recording or reproduction shown in FIG. 3. On the other hand, if the switch 8 detects that the cassette 5 is not loaded, the control circuit 31 supplies a signal to the cam motor 29 to rotate the cam 28 by the rotating angle θ1, so that the guide members move only to the third position shown in FIG. 4. Therefore, a time required for taking the projection into the apparatus is shortened, as shown in FIG. 9B.

The construction of the apparatus shown in FIG. 6 produces the same effect as that shown in FIG. 1A, and, furthermore, realizes a series of operations, that is, the movement of the guide members—the movement of the cassette loading stand 3—the movement of the guide members at the time of the cassette 5 being loaded, by changing or stopping the cam 28 at the respective rotating angles. Accordingly, the movement of the guide members and the movement of the cassette loading stand 3 can easily be effected by the same drive source.

Figure 8:
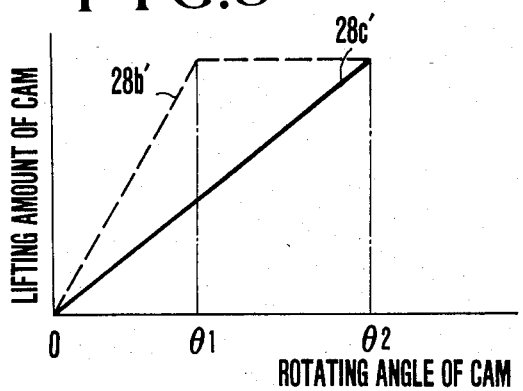
FIG. 8 is a view explaining the relation between the lifting amount and the rotating angle of a cam in a further embodiment of a recording or reproducing apparatus of the present invention.

FIG. 8 shows the relationship between the lifting amount and the rotating angle of a cam in a further embodiment of a recording or reproducing apparatus of the present invention. In this embodiment, a guide members moving mechanism included in the recording or reproducing apparatus has the substantially same construction as that shown in FIG. 6, but has the varied rotating angle of the cam. When the switch 8 detects that the cassette 5 is loaded, the cam 28 rotates by the rotating angle θ2. During this time, the lifting amount 28c' is continuously varied, so that the guide members (the guides 12 and 13, etc.) move to the second position adapted for recording or reproduction. At the same time, the lifting amount 28b' is continuously varied until the rotating angle becomes θ1, so that the cassette loading stand 3 moves to a predetermined position near the drum 10. On the other hand, when the switch 8 detects that the cassette 5 is not loaded, both the lifting amounts 28c' and 28b' are continuously varied until the rotating angle becomes θ1, so that the guide members (the guides 12 and 13, etc.) move to the third position and the cassette loading stand 3 moves to the above predetermined position at the same time. In each of the above embodiments, it goes without saying that the guide members (the guides 12 and 13, etc.), the cassette loading stand 3 and the cassette holder 2 are arranged such that their movements by the rotation of the cam 28 do not disturb one another.

The construction of the apparatus having the cam lifting amount shown in FIG. 8 produces the same effect as that shown in FIGS. 1A and 1B. Furthermore, since at least part of the movement of the guide members and the movement of the cassette loading stand 3 are effected at the same time, a time required for moving the guide members and the cassette loading stand 3 can be shortened more than that in the apparatuses shown in FIGS. 1A, 1B and 6.

While preferred embodiments of the present invention have been shown and described in detail to illustrate the application of the inventive principles, it will be understood that the invention is not limited to the embodiments and may be embodied otherwise without departing from such principles.

What is claimed is:

1. A recording or reproducing apparatus for use with a cassette housing therein a tape shaped record bearing medium, comprising:
   (A) a rotary head drum assembly having at least one rotary head for recording signals on or reproducing signals from the medium;
   (B) first means for selectively causing said cassette and said drum assembly to relatively come near to each other and to relatively go away from each other;
   (C) detection means for detecting whether said cassette is loaded or not;
   (D) loading means for pulling out the medium from said cassette and for engaging the pulled out medium with said drum assembly, said loading means including at least one movable member which is selectively movable to a first position for pulling out the medium from the cassette, a second position for engaging the pulled out medium with the drum assembly and a third position between said first and said second position; and
   (E) second means responsive to said detection means for operating said loading means, said second means moving said movable member between said first and said second positions when the cassette is loaded and moving the movable member between said first and said third positions when the cassette is not loaded.

2. The apparatus according to claim 1, further comprising:
   means for receiving said cassette;
   said first means being arranged to selectively cause said cassette receiving means and said drum assembly to relatively come near to each other and to relatively go away from each other.

3. The apparatus according to claim 2, wherein said drum assembly is fixedly arranged while said receiving means is movable; and said first means is arranged to move said receiving means relative to said drum assembly.

4. The apparatus according to claim 1, further comprising:
   control means for sequentially operating said first and said second means.

5. The apparatus according to claim 4, wherein said control means is arranged to firstly operate said second means to move said movable member from said first to said third positions and then operate said first means to cause said cassette and said drum assembly to relatively come near to each other.

6. The apparatus according to claim 4, wherein said control means is arranged to firstly operate said first means to cause said cassette and said drum assembly to relatively go away from each other and then operate said second means to move said movable member toward said first position.

7. The apparatus according to claim 1, further comprising:
   control means for concurrently operating said first and said second means.

* * * * *